US011698889B2

(12) United States Patent
Su et al.

(10) Patent No.: US 11,698,889 B2
(45) Date of Patent: Jul. 11, 2023

(54) METHOD, ELECTRONIC DEVICE, AND COMPUTER PROGRAM PRODUCT FOR PROCESSING DATA

(71) Applicant: EMC IP Holding Company LLC, Hopkinton, MA (US)

(72) Inventors: Pengfei Su, Shanghai (CN); Lu Lei, Shanghai (CN); Julius Jian Zhu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/246,293

(22) Filed: Apr. 30, 2021

(65) Prior Publication Data

US 2022/0245107 A1 Aug. 4, 2022

(30) Foreign Application Priority Data

Jan. 29, 2021 (CN) .......................... 202110123941.4

(51) Int. Cl.
  *G06F 16/21* (2019.01)
  *G06F 16/2455* (2019.01)
  *G06F 16/22* (2019.01)

(52) U.S. Cl.
  CPC ........ *G06F 16/219* (2019.01); *G06F 16/2246* (2019.01); *G06F 16/2282* (2019.01); *G06F 16/24568* (2019.01)

(58) Field of Classification Search
  CPC ............... G06F 16/219; G06F 16/2246; G06F 16/2282; G06F 16/24568
  See application file for complete search history.

(56) References Cited

U.S. PATENT DOCUMENTS

| 8,949,247 B2* | 2/2015 | Torbjornsen | G06F 16/319 |
| | | | 707/742 |
| 10,528,545 B1* | 1/2020 | Girulat, Jr. | G06Q 40/025 |
| 11,017,688 B1* | 5/2021 | Arazi | G16H 20/60 |
| 11,334,543 B1* | 5/2022 | Anwar | G06F 16/254 |
| 2012/0259824 A1* | 10/2012 | Zagelow | G06F 16/2272 |
| | | | 707/696 |

(Continued)

OTHER PUBLICATIONS

"Index API" Elastic Search. [https://www.elastic.co/guide/en/elasticsearch/reference/current/docs-index_.html], retrieved on Apr. 27, 2023, 11 pages.

*Primary Examiner* — Miranda Le
(74) *Attorney, Agent, or Firm* — Amin, Turocy & Watson, LLP

(57) ABSTRACT

Embodiments of the present disclosure relate to processing data. An example method includes acquiring data related to a first moment in streaming data of an object to be processed. The method further includes storing the data in a first entry of a data table based on an identification of the object to be processed, wherein the data table further includes a second entry before the first entry, and the second entry stores data related to a second moment before the first moment in the streaming data. The method further includes updating an index related to the object to be processed based on the first entry. Thus, a solution to the problem of performing search in data at different moments is provided, and it is unnecessary for a user to participate in the solution, thus improving the user experience and reducing the use of storage resources.

17 Claims, 4 Drawing Sheets

(56) References Cited

U.S. PATENT DOCUMENTS

| | | | |
|---|---|---|---|
| 2020/0301915 A1* | 9/2020 | Beringer | G06F 16/248 |
| 2020/0328961 A1* | 10/2020 | Puri | H04L 43/16 |
| 2020/0364279 A1* | 11/2020 | Pal | G06F 9/546 |
| 2022/0121628 A1* | 4/2022 | Devaraj | G06F 16/1824 |
| 2022/0121689 A1* | 4/2022 | James | G06F 16/24568 |
| 2022/0121708 A1* | 4/2022 | Burnett | G06F 16/9017 |

* cited by examiner

METHOD, ELECTRONIC DEVICE, AND COMPUTER PROGRAM PRODUCT FOR PROCESSING DATA

RELATED APPLICATION

The present application claims the benefit of priority to Chinese Patent Application No. 202110123941.4, filed on Jan. 29, 2021, which application is hereby incorporated into the present application by reference herein in its entirety.

TECHNICAL FIELD

Embodiments of the present disclosure relate to the field of data processing, and in particular, to a method, an electronic device, and a computer program product for processing data.

BACKGROUND

Streaming data is continuous data streams generated by various data sources. Common examples of the streaming data include Internet of Things (IoT) sensors, servers and security logs, real-time advertisements, and clickstream data from application programs and websites.

The streaming data is suitable for being stored and detected chronologically. Moreover, it is usually used for real-time data filtering, aggregation, association, or sampling. The streaming data plays an important role in real-time data analysis in the field of big data. However, there are still many problems to be solved in the process of processing the streaming data.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

A method, an electronic device, and a computer program product for processing data are provided in embodiments of the present disclosure.

According to a first aspect of the present disclosure, a method for processing data is provided. The method includes acquiring data related to a first moment in streaming data of an object to be processed. The method further includes storing the data in a first entry of a data table based on an identification of the object to be processed, wherein the data table further includes a second entry before the first entry, and the second entry stores data related to a second moment before the first moment in the streaming data. The method further includes updating an index related to the object to be processed based on the first entry.

According to a second aspect of the present disclosure, an electronic device is provided. The electronic device includes at least one processor; and a memory coupled to the at least one processor and having instructions stored thereon, wherein when executed by the at least one processor, the instructions cause the device to perform actions including: acquiring data related to a first moment in streaming data of an object to be processed; storing the data in a first entry of a data table based on an identification of the object to be processed, wherein the data table further includes a second entry before the first entry, and the second entry stores data related to a second moment before the first moment in the streaming data; and updating an index related to the object to be processed based on the first entry.

According to a third aspect of the present disclosure, a computer program product is provided. The computer program product is tangibly stored on a non-volatile computer-readable medium and includes machine-executable instructions. The machine-executable instructions, when executed, cause a machine to perform steps of the method in the first aspect of the present disclosure.

BRIEF DESCRIPTION OF THE DRAWINGS

The above and other objectives, features, and advantages of the present disclosure will become more apparent by describing the example embodiments of the present disclosure in more detail with reference to accompanying drawings. In the example embodiments of the present disclosure, the same reference numerals generally represent the same parts.

In the accompanying drawings, the same or corresponding reference numerals represent the same or corresponding parts.

DETAILED DESCRIPTION

Embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," etc.

may refer to different or the same objects. Other explicit and implicit definitions may also be included below.

The principles of the present disclosure will be described below with reference to several example embodiments shown in the accompanying drawings. Although example embodiments of the present disclosure are shown in the accompanying drawings, it should be understood that these embodiments are described only to enable those skilled in the art to better understand and then implement the present disclosure, and are not intended to impose any limitation to the scope of the present disclosure.

In traditional streaming data storage solutions, when newly obtained data is stored, historical data is replaced or the new data is added behind the historical data. For example, ByteStream is a stream that provides an access mode similar to a file stream. During recording, data is added, and therefore, the data can be stored in a persistent storage apparatus quickly.

Search for streaming data usually adopts a full-text search technology. The full-text search technology may perform search or look-up by using an index of the stored data. In a traditional search system, only the latest version of the streaming data and index data thereof are reserved.

Figure 1:
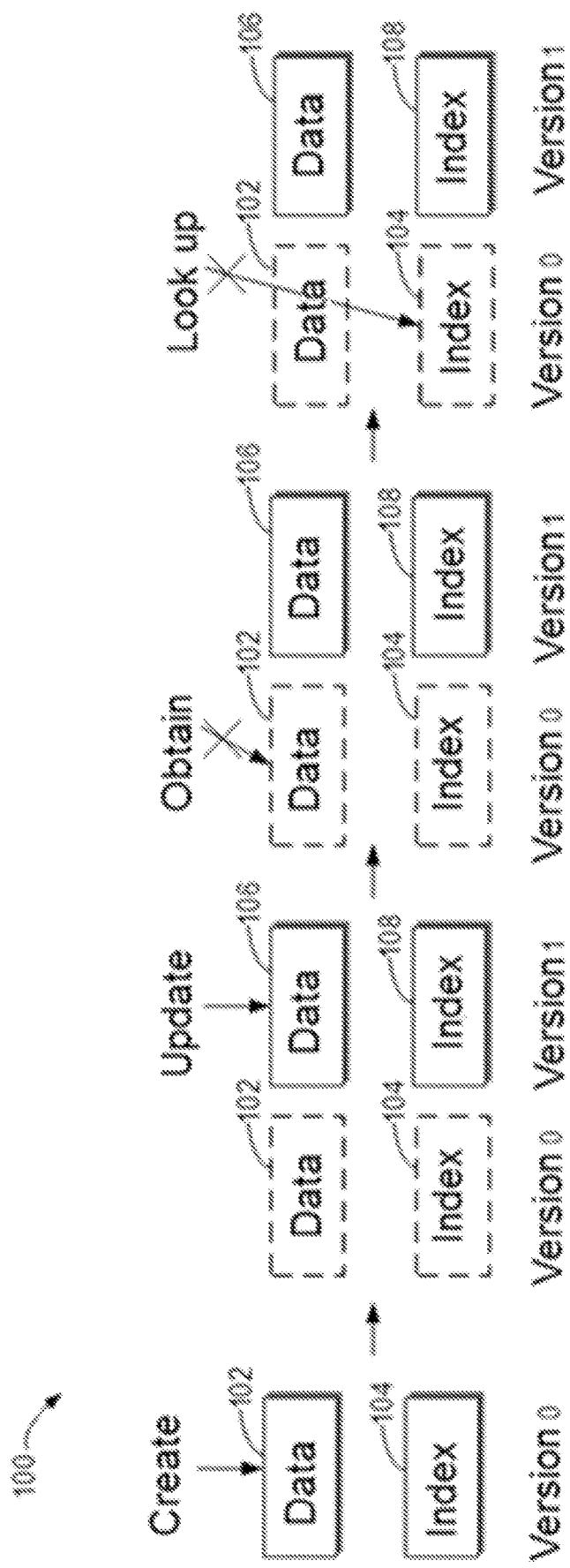
FIG. 1 is a schematic diagram of process 100 for processing data according to an embodiment of the present disclosure.

As shown in FIG. 1, for streaming data of a new object to be processed, when data 102 of the object to be processed is received, data 102 is stored in a memory, which is also referred to as that a piece of version-0 data is created. For the stored data, index 104 related to the object to be processed is constructed in an index structure. Then, an update operation is performed when new data comes. When the update operation is performed, the new data may be used to replace original data 102 to form data 106, or data 102 may be read and then combined with the new data to form data 106. At this point, it is referred to as version-1 data. Then, the index related to the object to be processed is updated according to data 106 to form index 108. After data 106 is formed, version-0 data 102 will no longer exist, and corresponding index 104 will not exist either. Therefore, a user cannot obtain version-0 data 102 or cannot look up data corresponding to the version 0 through index 104.

Moreover, if the version-1 data and the corresponding index are deleted, no data related to the object to be processed will exist. Therefore, the above storage method will cause failure in obtaining data in different versions, and it is unable to look up data in historical versions.

In order to at least solve the above and other potential problems, a method for processing data is proposed in an embodiment of the present disclosure. In the method, a computing device acquires data related to a first moment in streaming data of an object to be processed. Then, the computing device stores the data in a first entry of a data table by using an identification of the object to be processed. Then, the computing device updates an index related to the object to be processed based on the first entry. By means of this method, the problem of performing search in data in different versions is solved, and it is unnecessary for a user to participate in, thus improving the user experience and reducing the use of storage resources.

Figure 2:
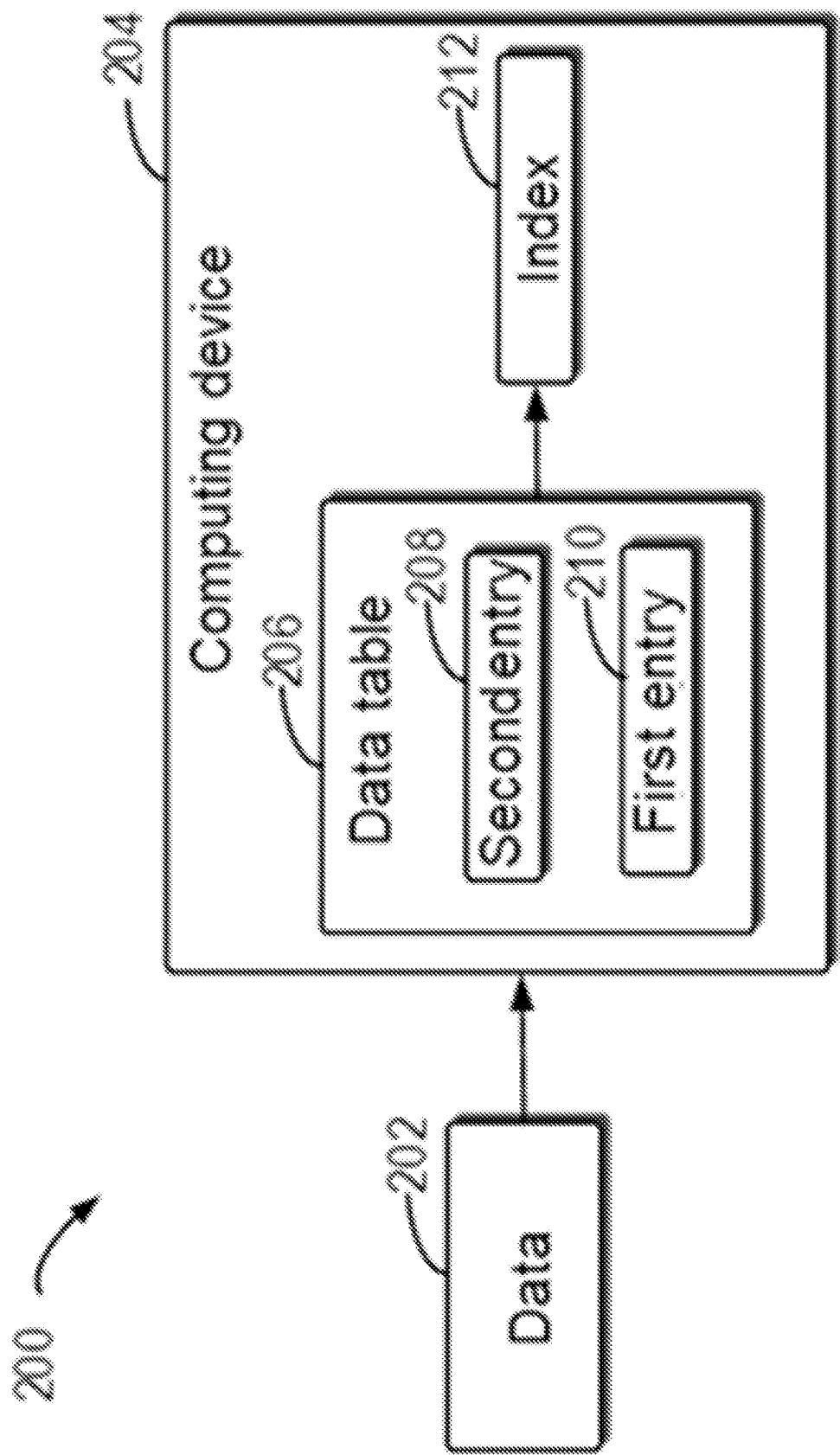
FIG. 2 is a schematic diagram of example environment 200 in which a device and/or a method according to an embodiment of the present disclosure can be implemented.

The embodiments of the present disclosure will be further described below in detail with reference to the accompanying drawings. FIG. 2 is a block diagram of example system 200 in which an embodiment of the present disclosure can be implemented. It should be understood that the structure of system 200 is described for illustrative purposes only and does not imply any limitation to the scope of the present disclosure.

System 200 includes computing device 204. Computing device 204 may implement management on streaming data.

Computing device 204 includes, but is not limited to, a personal computer, a server computer, a handheld or laptop device, a mobile device (such as a mobile phone, a personal digital assistant (PDA), and a media player), a multiprocessor system, a consumer electronic product, a small computer, a mainframe computer, a distributed computing environment including any of the above systems or devices, etc.

Computing device 204 receives data 202 in streaming data that forms an object to be processed. In some examples, when the object to be processed is a document, data 202 may be content newly added by a user or the complete content of the document after modification. In some embodiments, when a sensor is used to measure the object to be processed, data 202 may be sensor data for the object to be processed, for example, a measured temperature of a human. The above examples are only for describing the present disclosure, rather than specifically limiting the present disclosure. Data of any streaming data may be used as data 202.

After receiving data 202 at a current moment, computing device 204 will store it in data table 206 for the object to be processed. The current moment is also referred to as a first moment for ease of description. In some embodiments, only data in one aspect or of one attribute of the object to be processed is stored, and each entry in data table 206 is used to store data of the object to be processed received at each moment. In some embodiments, if data in multiple aspects or of multiple attributes of the object to be processed needs to be stored, data table 206 is a data table used to store one aspect or one attribute thereof. Only one data table 206 is shown in FIG. 1; however, it is only an example, rather than a specific limitation to the present disclosure. Data of other attributes or in other aspects may be stored in data tables similar to data table 206. For example, corresponding data may be stored respectively in different data tables for attributes such as title, content, and writer of the same document; or when the same object to be processed is measured by multiple sensors, one corresponding data table is provided for a sensor of each measured part for storing data at different moments.

Data 202 may be stored as first entry 210. The data table further includes second entry 208, and second entry 208 further stores data related to a second moment before the first moment in the streaming data. One second entry 208 is shown in FIG. 1, and it is only an example, rather than a specific limitation to the present disclosure. Data table 206 may include any number of second entries.

In some embodiments, if data 202 is incremental data with respect to the previously transmitted data, data 202 is directly stored as first entry 210. In some embodiments, if data 202 includes the previously transmitted data, data 202 may be compared with the latest transmitted data, and different data is stored in first entry 210. For example, the user further modifies the document after storing the document previously, and then stores the whole text again. At this point, the modified document may be compared with the previous document, and a different part may be stored. In some embodiments, data 202 is directly stored as first entry 210. The above examples are only intended to describe the present disclosure, rather than individually limiting the present disclosure.

Alternatively or additionally, if the data in the streaming data includes the data corresponding to multiple attributes or multiple aspects of the object to be processed, data corresponding to each attribute field may be determined, and the data in each attribute may be compared with the previously stored data. Then, modified content is stored only in an attribution having a modification. The above examples are only for describing the present disclosure, rather than specifically limiting the present disclosure. Those skilled in the art may determine the content stored in the entry of the data table as required.

Computing device 204 re-adjusts index 212 for the object to be processed by using first entry 210. The index 212 may then be used in the look-up process. For example, when the object to be processed is a document, index entries for multiple characters in an inverted structure or tree index structure is generated or updated based on the content of the document. If a word in the document appears in the index structure, an index entry including an identification of the document is generated behind the word. Then, during search using characters, it may be determined whether the searched characters exist in the document.

By means of the above method, the problem of performing search in data in different versions is solved, and it is unnecessary for a user to participate in, thus improving the user experience and reducing the use of storage resources.

Figure 3:
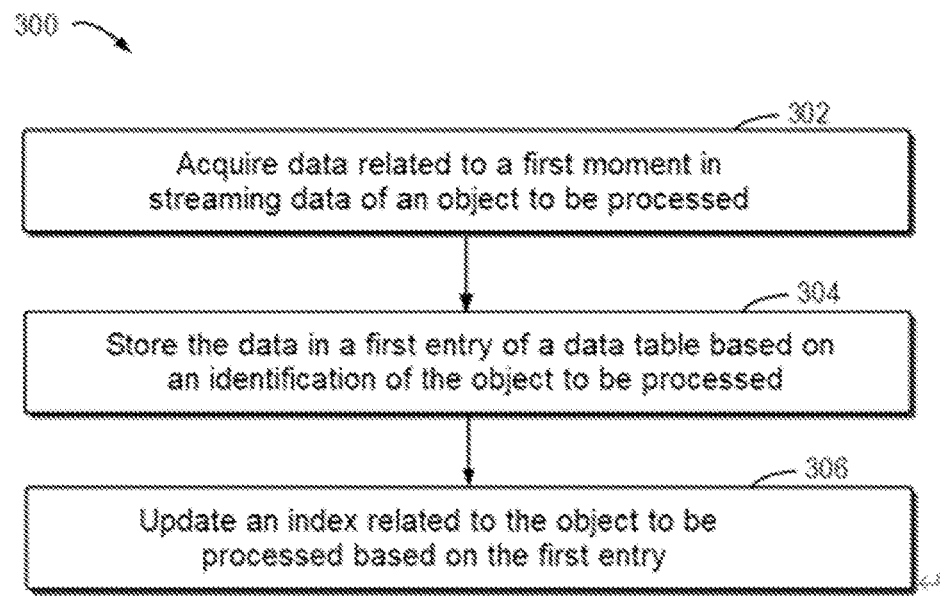
FIG. 3 is a flowchart of method 300 for processing data according to an embodiment of the present disclosure.

A schematic diagram of example environment 200 in which a device and/or a method according to an embodiment of the present disclosure may be implemented has been described above with reference to FIG. 2. A flowchart of method 300 for processing data according to an embodiment of the present disclosure will be described below with reference to FIG. 3. Method 300 may be performed at computing device 204 in FIG. 2 or any suitable computing device. The embodiment of FIG. 3 is further described below with reference to example environment 200 shown in FIG. 2, in which a device and/or a method according to an embodiment of the present disclosure may be implemented.

In block 302, computing device 204 acquires data 202 related to a first moment in streaming data of an object to be processed. Computing device 204 continuously acquires data in the streaming data to store the data in a local storage device or a storage apparatus connected to computing device 204.

In some embodiments, data 202 may be data for the entire object to be processed. In some embodiments, data 202 may be incremental data or modified data for the object to be processed. In some embodiments, the object to be processed may be a document. In some embodiments, the object to be processed may be an object monitored by a sensor. The above examples are only for describing the present disclosure, rather than specifically limiting the present disclosure. Those skilled in the art may set the content of the data and determine the object to be processed as required.

In block 304, computing device 204 stores the data in first entry 210 of data table 206 based on an identification of the object to be processed. The data table further includes second entry 208 before first entry 210, and second entry 208 stores data related to a second moment before the first moment in the streaming data.

In some embodiments, computing device 204 receives all data of the object to be processed. Then, computing device 204 determines, from the data table, an entry adjacent to first entry 210, which is also referred to as a third entry for ease of description. Then, reference data in the third entry is compared with the data to determine a different part between the data. Then, computing device 204 stores the different part in first entry 210. In this way, a large amount of storage resources may be saved.

In some embodiments, data 202 received by computing device 204 may be incremental data or modified data. Computing device 204 directly stores data 202 as first entry 210.

The above examples are only for describing the present disclosure, rather than specifically limiting the present disclosure.

In block 306, computing device 204 updates an index related to the object to be processed based on first entry 210. After data 202 is stored in first entry 210, index 212 related to the object to be processed needs to be adjusted.

In some embodiments, data 202 received by computing device 204 is newly added data. If the index is related to the complete data of the object to be processed, for example, the document, the newly added part is an added document, and at this point, it is only necessary to adjust index 212 related to the object to be processed in the index structure. Therefore, computing device 204 determines a first data element in the first entry. Then, computing device 204 generates an index entry corresponding to the first data element, wherein the index entry includes the identification of the object to be processed. Computing device 204 adds the index entry to a list of the first data element in the index structure related to the object to be processed. By means of the above manner, the index corresponding to the object to be processed may be added quickly.

Alternatively or additionally, if the index structure is determined based on the latest received data, at this point, in addition to adding the index entry in the above manner, it is further necessary to remove the previous index entry related to the object to be processed from the original index structure. Computing device 204 determines, from the index structure, a second data element related to the object to be processed based on the identification of the object to be processed. Then, computing device 204 deletes the index entry related to the object to be processed from a list of the second data element in the index structure. In this way, the previous index information can be removed quickly. For example, when temperature data measured by the sensor is received, in an index structure based on the magnitude of temperature, it is necessary to delete an index entry related to the previous temperature of the sensor, and add an index entry of the sensor behind a new temperature. The above examples are only for describing the present disclosure, rather than specifically limiting the present disclosure. Those skilled in the art may set adjustment of the index structure as required.

In some embodiments, the index structure is an inverted index structure or a tree index structure. The above examples are only for describing the present disclosure, rather than specifically limiting the present disclosure. Those skilled in the art may set the index structure in any suitable manner as required.

In some embodiments, computing device 204 receives a look-up request for the streaming data. If the request includes the identification of the object to be processed, computing device 204 obtains a historical entry for the object to be processed from a data table for the object processed. The historical entry is also referred to as a fourth entry, and is an entry before current first entry 210. Computing device 204 determines a historical index related to the object to be processed based on the fourth entry for look-up. An index related to the object to be processed is regenerated or adjusted by using the fourth entry. By means of the above manner, look-up may be performed quickly through the historical index to quickly acquire information in the past.

Figure 4:
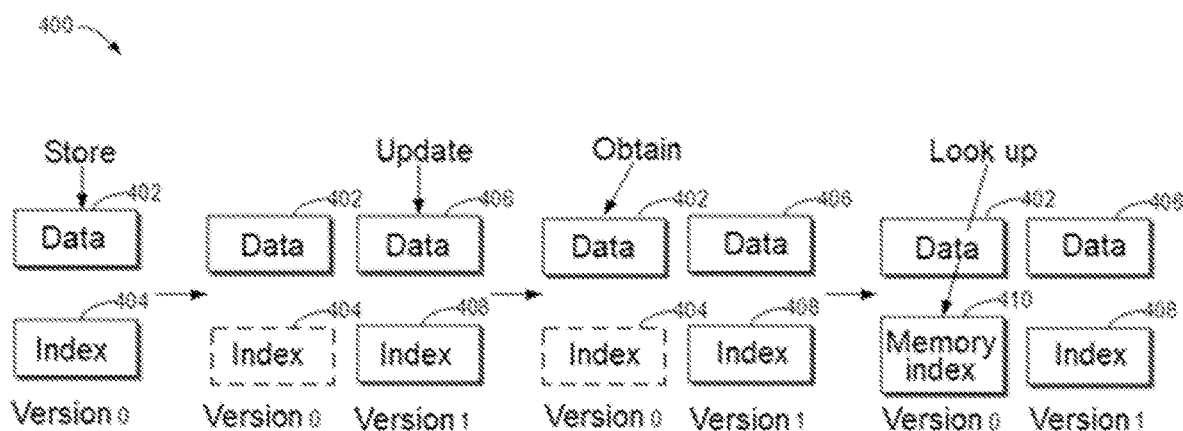
FIG. 4 is a schematic diagram of process 400 for processing data according to an embodiment of the present disclosure.

As shown in FIG. 4, after data 402 in the streaming data of the object to be processed is obtained, data 402 is stored. Then, index 404 related to the object to be processed is generated or updated according to data 402. In some embodiments, if no index exists, an index for data 402 may be generated based on data 402. For example, if data 402 is document data, an inverted index of the document may be generated by using data 402.

In some embodiments, if an index of an object similar to the object to be processed has existed, the index may be adjusted such that it includes an index entry related to data 402. For example, if data 402 is document data and an inverted index constructed by another document exists, an index entry of the object to be processed may be added behind a character in the inverted index the same as a character in data 402. If no character in data 402 exists in the index, the character is added to the inverted index, and the index entry of the object to be processed is added behind the character. The above examples are only for describing the present disclosure, rather than specifically limiting the present disclosure.

Then, data 406 is received. The newly received data 406 and data 402 are stored as different entries or data items. Then, the index is readjusted based on data 406 or a combination of data 402 and data 406 to form new index 408. At this point, the user may obtain data 402 at the previous moment. If it is intended to perform look-up by using index 408 and the historical index of the previous moment, data 402 may be used in the memory to form memory index 410 the same as index 404. Therefore, look-up may be performed by using memory index 410 and index 408.

Figure 5:
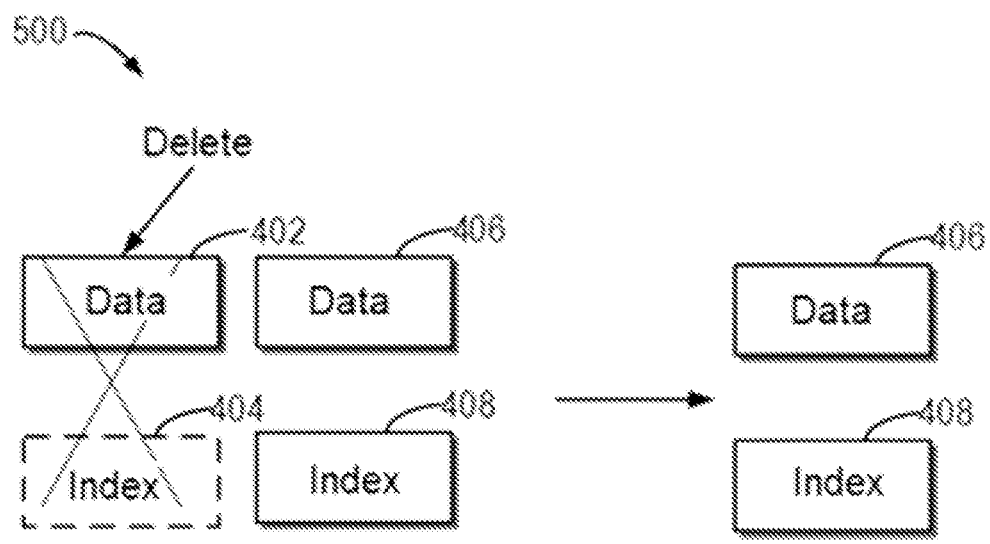
FIG. 5 is a schematic diagram of process 500 of deleting data according to an embodiment of the present disclosure.

Description is continued with reference to FIG. 3 again, and in some embodiments, a historical entry before the first entry is deleted if it is determined that the size of the streaming data of the object to be processed exceeds a threshold size. In some embodiments, the user may delete some historical entries according to his/her own needs. In this way, a large amount of storage space may be saved. In process 500 of deleting data as shown in FIG. 5, a data stream of the object to be processed includes data 402 and data 406, and the user may delete data 402. After data 402 is deleted, corresponding index 404 thereof cannot be recovered either. At this point, only data 406 and corresponding index 408 thereof exist.

In some embodiments, if the manner of storing data is incremental storage, for example, data of a sensor or log data, deletion may be performed directly. In some embodiments, if the data stream is data stored in a manner of storing differential data, first item of data recorded behind data to be deleted may be recovered first, and the data to be deleted is then deleted. The first item of data is compared with the data before the data to be deleted to determine a different content. The different content is then re-stored. In this way, data can be deleted quickly to save storage resources. The above examples are only for describing the present disclosure, rather than specifically limiting the present disclosure.

By means of this method, the problem of performing search in data in different versions is solved, and it is unnecessary for a user to participate in, thus improving the user experience and reducing the use of storage resources.

Figure 6:
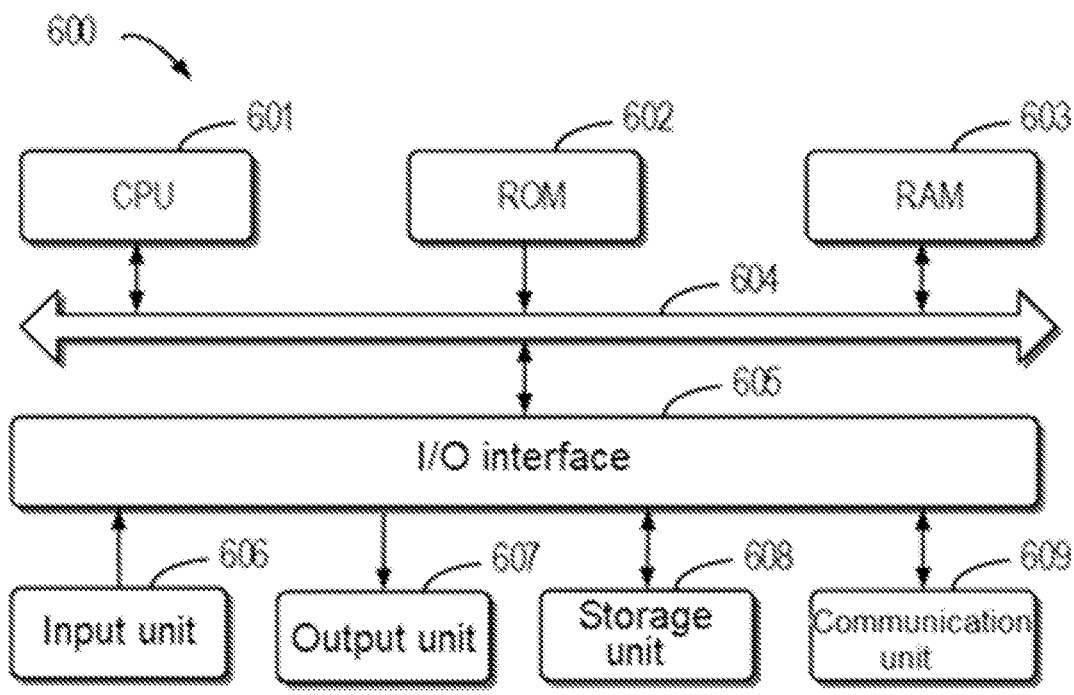
FIG. 6 is a schematic block diagram of example device 600 applicable to implementing an embodiment of content of the present disclosure.

FIG. 6 is a schematic block diagram of example device 600 that may be configured to implement an embodiment of the present disclosure. Computing device 204 in FIG. 2 may be implemented by using device 600. As shown in the drawing, device 600 includes central processing unit (CPU) 601 that may perform various appropriate actions and processing according to computer program instructions stored in read-only memory (ROM) 602 or computer program instructions loaded from storage page 608 into random access memory (RAM) 603. In RAM 603, various programs and data required for operations of device 600 may also be stored. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage page 608, such as a magnetic disk and an optical disc; and communication unit 609, such as a network card, a modem, and a wireless communication transceiver. Communication unit 609 allows device 600 to exchange information/data with other devices over a computer network such as an Internet and/or various telecommunication networks.

Various processes and processing described above, e.g., method 300 and processes 400 and 500, may be performed by processing unit 601. For example, in some embodiments, method 300 may be implemented as a computer software program that is tangibly included in a machine-readable medium, such as storage page 608. In some embodiments, part or all of the computer program may be loaded and/or installed onto device 600 via ROM 602 and/or communication unit 609. When the computer program is loaded into RAM 603 and performed by CPU 601, one or more actions of method 300 and processes 400 and 500 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in one programming language or any combination of a plurality of programming languages, including an object oriented programming language such as Smalltalk and C++, and a conventional procedural programming language such as the "C" language or a similar programming language. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block of the flowcharts and/or block diagrams and combinations of various blocks in the flowcharts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce an apparatus for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the system architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed substantially in parallel, and sometimes they may also be executed in an inverse order, which depends on involved functions. It should be further noted that each block in the block diagrams and/or flowcharts as well as a combination of blocks in the block diagrams and/or flowcharts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, or to enable other persons of ordinary skill in the art to understand the embodiments disclosed herein.

However, performing look-up between events in different versions is a common situation. For example, each modification to a specific file will be recorded as an event. Each time a file is created for the first time, an event will be created, and each modification to the file will be considered as an update event of the event for the same object. The latest version and a historical version of the look up event have the same importance.

What is claimed is:

1. A method, comprising:
  acquiring, by a device comprising a processor, a first portion of data related to a first moment in continuously streaming data, received via a network, to facilitate extraction of data from the continuously streaming data, wherein the continuously streaming data pertains to a computing object to be processed;
  determining, by the device, that the first portion of data comprises first data pertaining to the computing object;
  storing, by the device, the first data in a first entry of a data table of a data structure created for the computing object, wherein the data table further comprises a second entry, and the second entry stores second data related to a second moment that occurred prior to the first moment in the continuously streaming data; and
  updating, by the device, an index, wherein the index details the first data and second data in the data table related to the computing object;
  receiving a look-up request for the continuously streaming data;

in response to determining that the look-up request comprises an identification of the computing object to be processed, obtaining a third entry for the computing object to be processed based on the identification, wherein the third entry is an entry stored to the data table prior to the first entry; and determining, based on the third entry, a historical index related to the computing object to be processed for look-up according to the look-up request.

2. The method according to claim 1, wherein storing the first data in the first entry of the data table comprises:

identifying, in the data table, a third fourth entry, wherein the third fourth entry includes third fourth data and the third fourth entry was stored prior to storing of the first entry;

comparing the third fourth data with the first data to determine a data difference between the third fourth data and the first data;

extracting the data difference from the third fourth data;

identifying the data difference as new third fourth data;

storing the new third fourth data in conjunction with the first data;

deleting the third fourth data from which the data difference was extracted; and updating the index with details of the new third fourth data.

3. The method according to claim 1, wherein updating the index comprises:

determining a first data element in the first entry of the data table;

generating an index entry corresponding to the first data element, wherein the index entry comprises an identification of the computing object to be processed; and adding the index entry to a list associated with the first data element in an index structure related to the computing object to be processed.

4. The method according to claim 3, wherein the list associated with the first data element is a first list, and wherein updating the index related to the computing object to be processed further comprises:

determining, from the index structure, a second data element related to the computing object to be processed based on an identification of the computing object to be processed; and deleting the index entry related to the computing object to be processed from a second list associated with the second data element in the index structure.

5. The method according to claim 3, wherein the index structure is an inverted index structure or a tree index structure.

6. The method according to claim 1, further comprising:

in response to determining that a size of the continuously streaming data exceeds a threshold size, deleting an entry of the data table that was stored in the data table prior to the first entry.

7. A device, comprising:

at least one processor; and a memory coupled to the at least one processor and having instructions stored thereon, wherein when executed by the at least one processor, the instructions cause the device to perform actions comprising:

acquiring a first portion of data related to a first moment in continuously streaming data to enable extraction of data from the streaming data, the extraction resulting in extracted data, wherein the extracted data pertains to a computing object to be processed;

determining that the first portion of data comprises first data pertaining to the computing object;

storing the first data in a first entry of a data table generated for the computing object, wherein the data table further comprises a second entry that stores second data related to a second moment previous to the first moment in the continuously streaming data; and updating an index, wherein the index lists the first data and second data stored in the data table related to the computing object;

receiving a look-up request for the continuously streaming data;

in response to determining that the look-up request comprises an identification of the computing object to be processed, obtaining a third entry for the computing object to be processed based on the identification, wherein the third entry is an entry that was stored before the first entry; and determining, based on the third entry, a historical index related to the computing object to be processed for look-up.

8. The device according to claim 7, wherein storing the first data in the first entry of the data table comprises:

determining, from the data table, a third fourth entry, wherein the third fourth entry comprises third fourth data related to the computing object;

comparing data of the third fourth data in the third fourth entry with the first data to determine a data difference between the first data and the third fourth data;

extracting the data difference from the third fourth data;

identifying the data difference as extracted third fourth data;

storing the extracted third fourth data in the data table;

deleting the third fourth data from which the extracted third data was extracted; and storing the extracted third fourth data with the first entry in the data table.

9. The device according to claim 7, wherein updating the index related to the computing object to be processed comprises:

determining a first data element in the first entry in the data table;

generating an index entry corresponding to the first data element, wherein the index entry comprises an identification of the computing object to be processed; and adding the index entry to a first list of the first data element in an index structure related to the computing object to be processed.

10. The device according to claim 9, wherein updating the index related to the computing object to be processed further comprises:

determining, from the index structure, a second data element related to the computing object to be processed based on an identification of the computing object to be processed; and deleting the index entry related to the computing object to be processed from a second list of the second data element in the index structure.

11. The device according to claim 9, wherein the index structure is an inverted index structure.

12. The device according to claim 7, wherein the actions further comprise:

deleting a historical entry that was stored before the first entry in response to determining that a size of the data stored in the data table exceeds a threshold size.

13. A computer program product stored on a non-transitory computer-readable medium and comprising machine-executable instructions, wherein, when executed, the machine-executable instructions cause a machine comprising a processor to perform operations, comprising:

acquiring a first portion of data related to a first moment in continuously streaming data to facilitate extraction of data from the streaming data, the extraction resulting in extracted data, wherein the extracted data pertains to an object to be processed;

determining that the first portion of data comprises first data pertaining to the object;

storing the first data in a first entry of a data table created for the object, wherein the data table further comprises a second entry, and wherein the second entry stores second data related to a second moment occurring prior to the first moment in the continuously streaming data; and updating an index, wherein the index lists the first data and second data in the data table related to the object;

receiving a look-up request for the continuously streaming data;

based on a determination that the look-up request comprises an identification of the object to be processed, obtaining a third entry for the object to be processed based on the identification, wherein the third entry is an entry before the first entry; and determining, based on the third entry, a historical index related to the object to be processed for look-up.

14. The computer program product according to claim 13, wherein storing the first data in the first entry of the data table comprises:

determining, from the data table, a third fourth entry, wherein the third fourth entry comprises third fourth data stored prior to the first data;

comparing the third fourth data with the first data to determine a difference in data between the third fourth data and the first data;

extracting the data difference from the third fourth data;

identifying the data difference as extracted third fourth data; and replacing, in the data table, the third fourth data with the extracted third fourth data.

15. The computer program product according to claim 13, wherein updating the index comprises:

determining a first data element in the first entry of the data table;

generating an index entry corresponding to the first data element, wherein the index entry comprises an identification of the object to be processed;

adding the index entry to a first list relating to the first data element in an index structure related to the object to be processed;

determining, from the index structure, a second data element related to the object to be processed based on the identification of the object to be processed; and deleting the index entry related to the object to be processed from a second list relating to the second data element in the index structure.

16. The computer program product according to claim 15, wherein the index structure is a tree index structure.

17. The computer program product according to claim 13, wherein the operations further comprise:

in response to a determination that storage of the first data in the data table will cause the amount of data stored in the data table to exceed a threshold size, deleting an entry in the data table saved prior to the first entry.

* * * * *